United States Patent [19]
Hamilton, Jr. et al.

[11] Patent Number: 5,446,558
[45] Date of Patent: * Aug. 29, 1995

[54] APPARATUS AND ASSOCIATED METHOD FOR REPRESENTING ELLIPTICAL HALFTONE DOTS

[75] Inventors: John F. Hamilton, Jr., Rochester; Anthony J. Leone, III, Pittsford, both of N.Y.

[73] Assignee: Eastman Kodak Company, Rochester, N.Y.

[*] Notice: The portion of the term of this patent subsequent to Aug. 24, 2010 has been disclaimed.

[21] Appl. No.: 956,930

[22] Filed: Oct. 5, 1992

[51] Int. Cl.$^6$ .............................................. H04N 1/40
[52] U.S. Cl. ..................... 358/454; 358/456; 358/459; 358/460; 395/109; 395/110
[58] Field of Search ............. 358/459, 460, 456, 298, 358/454; 395/110, 109, 150; 382/44, 45, 47, 54; 340/747, 750; 348/89, 147

[56] References Cited

U.S. PATENT DOCUMENTS

| | | |
|---|---|---|
| 2,304,163 | 12/1942 | Goldsmith . |
| 3,911,480 | 10/1975 | Brucker . |
| 3,922,484 | 11/1975 | Keller . |
| 4,196,451 | 4/1980 | Pellar . |
| 4,498,108 | 2/1985 | Lindemann et al. . |
| 4,680,645 | 7/1987 | Dispoto et al. . |
| 4,727,430 | 2/1988 | Miwa . |
| 4,768,101 | 8/1988 | Webb . |
| 4,916,545 | 4/1990 | Granger ............................. 358/456 |
| 4,918,622 | 4/1990 | Granger et al. . |
| 4,924,301 | 5/1990 | Surbrook . |
| 4,977,458 | 12/1990 | Granger et al. . |
| 5,032,851 | 7/1991 | Yoshimura ........................ 358/298 |
| 5,150,225 | 9/1992 | Kreitman ........................... 358/456 |
| 5,239,391 | 8/1993 | Hamilton ........................... 358/459 |

*Primary Examiner*—Scott A. Rogers
*Attorney, Agent, or Firm*—Edward Dugas

[57] ABSTRACT

An apparatus and method are implemented in a halftone printing system utilizing logic blocks that permit a halftone elliptical dot to be represented by an elliptical envelope that is formed from a combination of straight lines that are drawn from tangent points, on the outer periphery of the elliptical dot, through reference axis for the elliptical dot. The intersection points of the tangent lines on the reference axis define the size (density) of the elliptical dot. Storing the intersect points as sets of values for each size elliptical dot provides a unique representation set that is used to reconstruct a selected elliptical dot size for printing a halftone image.

9 Claims, 17 Drawing Sheets

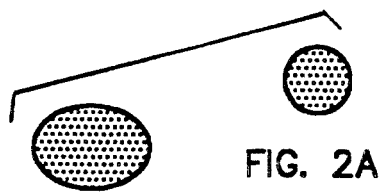
FIG. 2A
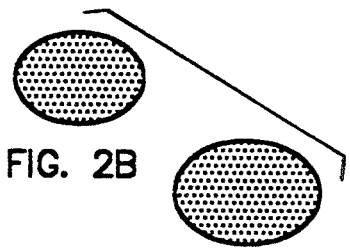
FIG. 2B
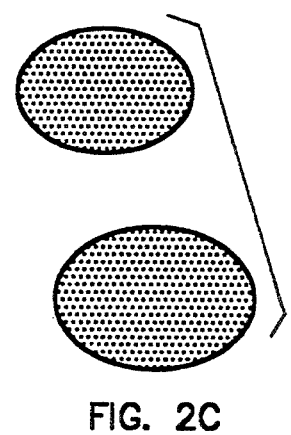
FIG. 2C
FIG. 2I
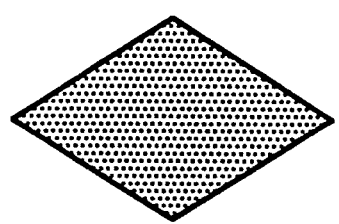
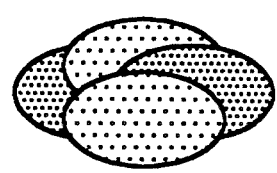
FIG. 2D
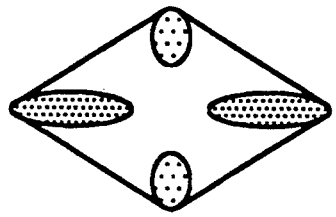
FIG. 2H
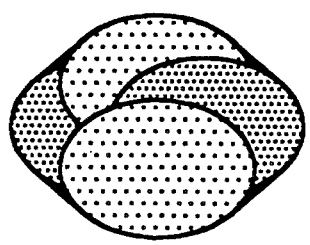
FIG. 2E
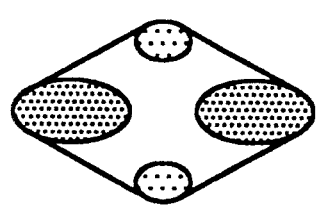
FIG. 2G
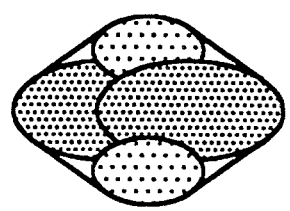
FIG. 2F

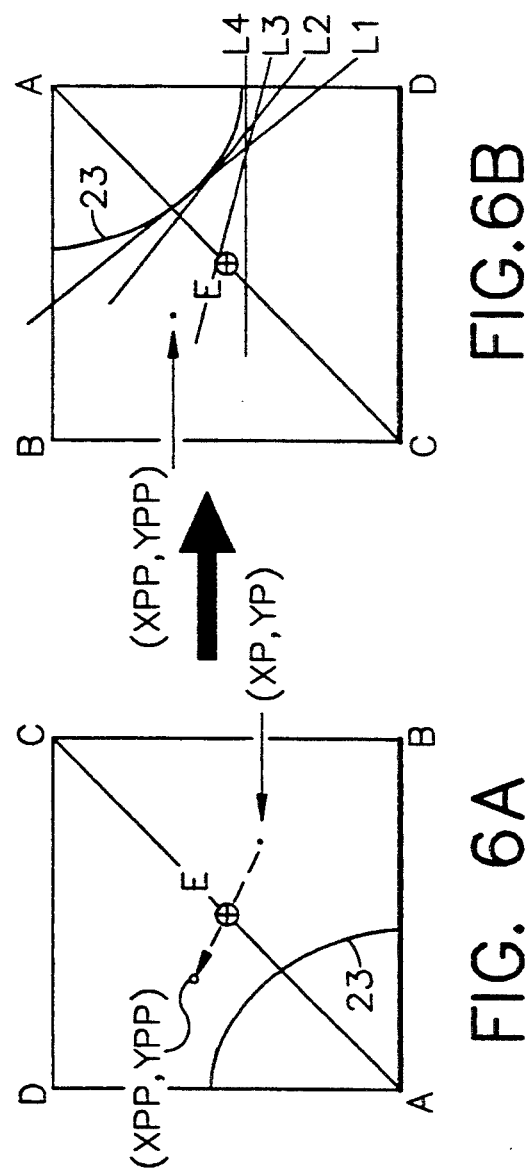

APPARATUS AND ASSOCIATED METHOD FOR REPRESENTING ELLIPTICAL HALFTONE DOTS

CROSS-REFERENCE TO RELATED APPLICATION

The present application is related to U.S. patent application Ser. No. 854,176, filed Mar. 20, 1992, entitled "An Apparatus for Halftone Dot Representation" and to U.S. patent application Ser. No. 854, 164, filed Mar. 20, 1992, entitled "An Envelope Method For Halftone Dot Representation".

FIELD OF THE INVENTION

The present invention is directed to the field of halftone printing wherein arrays of bit maps are used to form dot shapes on the printing media and more particularly to a unique apparatus and associated method for representing the shapes of the dots as ellipses that minimizes the amount of memory needed for storing the representations.

BACKGROUND OF THE INVENTION

In the halftone printing art variations in the density of a color are represented by variations in the size (area) of small dots on a grid pattern. This permits the visual detection of shades of gray and color tone. A patent of interest for its teaching of dot size being a function of density is U.S. Pat. No. 4,680,645, entitled "Method For Rendering Gray Scale Images With Variable Dot Sizes" by Dispoto et al. With such methods the dots themselves do not have to be circular in shape but can have any number of shapes. With the advent of digital computers and digital printers into the printing art, digital bits, representing the desired sizing and shape of the dots, are stored and accessed from the computer or printer's memory and are used to cause the desired printing of the images onto hard copy. In digital systems the halftone dot shapes may be stored either as arrays of threshold values (e.g., 64×64×8 bits) or as arrays of bitmaps (e.g., 64×64×256 bits). The quality of the shape of the dots is a function of the number of bits (sample points) that are used in the printing process. Obviously, as more bits are used to increase the quality of the formed dot the greater will be the use of the computer or printer's memory space. In addition, with more bits stored in memory the longer it will take, in terms of access time, to call forth all the bits needed to drive the printing device. In the art, the number of sample points used to represent an image in an array of spaced rows and columns of sample points is called the mesh. It has been shown that there is an improvement in the quality of formed dots when the number of sample points in an array increases. What is known is that sampling in a 256×256 array or a 128×128 array, in place of a 64×64 array, achieves only a slightly improved dot shape at the cost of 16 times and 4 times, respectively, in the amount of memory required to store the threshold or bitmap values.

In addition to the above mentioned increase in memory requirement, to achieve an increase in the quality of the formed dots when a digital screening pattern is used to print out the dots a problem of automotive or patterning is created. This is caused by the step of re-sampling the already sampled dot shapes. These problems have caused a great deal of development time to be spent looking for the "magic" combinations of screen rulings and screen angles which will produce dots without moire through the entire range of dot sizes. The present invention provides an improved solution to these problems.

SUMMARY OF THE INVENTION

The present invention uses an "envelope" technique for defining the shape and the size of elliptical dots by approximating the dot's shape with an envelop of lines straight or curved. When an elliptical dot is formed, only the bit values representing one-eight of the elliptical dot need be used to replicate the full dot. Also, by using lines having slopes which are exact powers of two, the required multiplications needed to form the envelope of the elliptical dot can be achieved by simply shifting bits. The present invention is directed specifically to the forming and the handling of "elliptical" halftone dots.

In one embodiment the present invention the convex surface of an elliptical dot pattern is represented by a plurality of straight lines each tangent to a portion of the convex surface and intersecting a reference axis to the elliptical dot. The intersection point, on the reference axis, together with the slope of the line and in combination with other intersection points forms the envelope shape of the elliptical dot pattern from which it was made. If each of the plurality of lines is assigned a unique slope then only the intersect points need be recorded to enable a representation from the stored values.

In another embodiment of the invention, a look-up table is used to store the points of intersection. The number of points selected thereby enabling the quality of the eliptical dot to be selected.

From the foregoing it can be seen that it is a primary object of the present invention to provide an improved apparatus and associated method for digitally representing the shape and size of an elliptical halftone dot.

It is another object of the present invention to provide an apparatus and associated method for representing an elliptical halftone dot with a minimum number of binary bits which in turn reduces the amount of storage space (computer memory) needed for storing point fonts of various densities.

These and other objects of the present invention will become more apparent when taken in conjunction with the following description and drawings wherein like characters indicate like parts and which drawings form a part of the present description.

BRIEF DESCRIPTION OF THE DRAWINGS

FIGS. 2A through 2I illustrate the sequence of development of elliptical dots each having a different density or area.

FIGS. 6A and 6B illustrate the transposing of an elliptical dot formation through a center point E to transform from a concave boundry to a convex boundry.

DESCRIPTION OF THE PREFERRED EMBODIMENTS

Figure 1A:
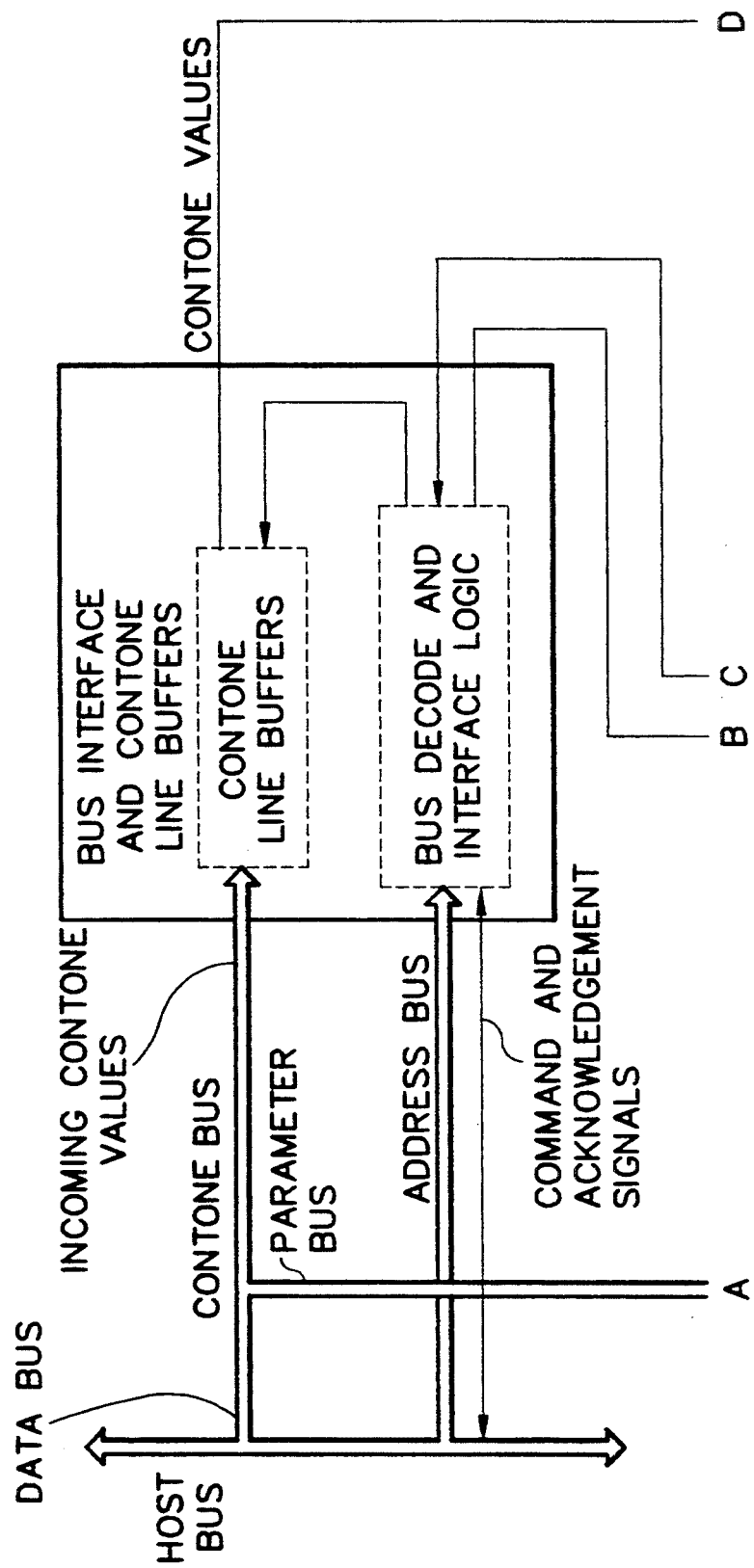
FIGS. 1A and 1B illustrate, in block diagram form, a prior art system to which the present apparatus and associated method may be added.

Before describing in detail the implementation of the present method in a digital halftone printing system it should be observed that the present invention resides in a novel method and unique structural combination of conventional digital signal processing components and not in the particular detailed configurations thereof.

Accordingly, the arrangement of these conventional components have been illustrated in the drawings by readily understandable block diagrams that show only those specific details that are pertinent to the present invention, so as not to obscure the disclosure with structural details which will be readily apparent to those skilled in the art having the benefit of the teachings herein. Thus, the block diagram illustrations of the Figures are primarily intended to illustrate the major structural components of the system in a convenient functional grouping, whereby the present invention may be more readily understood.

Figure 1B:
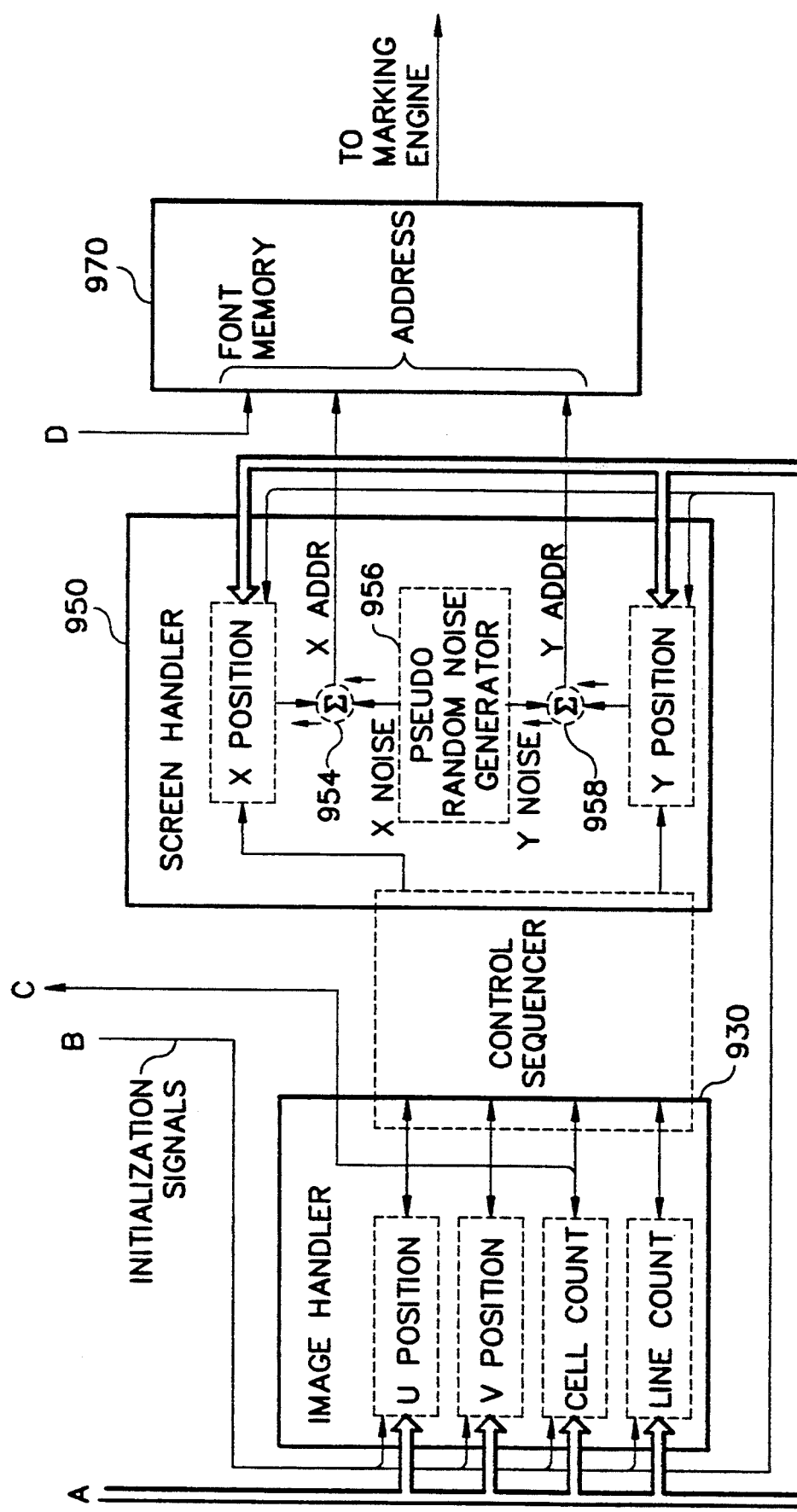

FIGS. 1A and 1B illustrate one prior art version of a digital halftone printing system capable of performing the method of the present invention. FIGS. 1A and 1B have been taken from FIG. 9 of U.S. Pat. No. 4,918,622 entitled "Electronic Graphic Arts Screener" by E. M. Granger and J. F. Hamilton. Dr. Hamilton is also the inventor of the present invention. The teachings of U.S. Pat. No. 4,918,622 are incorporated fully herein by reference. The image to be printed by the referenced system is formed into multi-bit pixel values (contone pixel values) that are sampled in response to the requirements of the marking engine (printing device such as a laser printer). Often the multi-bit pixel value is 8-bits in depth, but other values may also be used. For example, in the simplest situation, if the input image is sampled at 400 pixels per inch and the printing device writes at 2,000 spots per inch then each contone pixel value would be sampled 5 times by a screener (see for example the image handler 930 as described in detail in U.S. Pat. No. 4,918,622). For those instances where the sampling rate is not an exact divisor of the writing pitch the above referenced patent describes the procedure to be used in detail. Referencing the screen handler 950 of the subject patent the X-position and the Y-position registers provide the X and Y sampling coordinates to the font decoder 100 of the present invention, illustrated in FIG. 7. The pseudo random noise generator 956 and the summing nodes 954 and 958 shown in FIG. 9, box 950, of the U.S. Pat. No. 4,918,622 patent are not required for the present invention. The font decoder 100 also provides the improved means for supplying the bit mapped data thereby eliminating the extensive and costly font memory incorporated in the prior art font memory 970.

FIGS. 2A through 2C, illustrate a sequence of elliptical dots of increasing size (area) that would be used to create regions of increasing density in a printed image. In the invention the size of the dots is requested, for example, by the contone values described above which are typically 0 to 255. FIGS. 2D through 2I show the transition of the dot shape from one size to a larger size, using elliptical and straight line components. FIG. 2I illustrates a dot shaped as a diamond. Although the dot shapes selected for purposes of illustration of dot transitions start as an elliptical shape and transform to a diamond shape in the preferred embodiment of the invention, many other transitional variations are possible within the teachings of the present invention.

Figure 3:
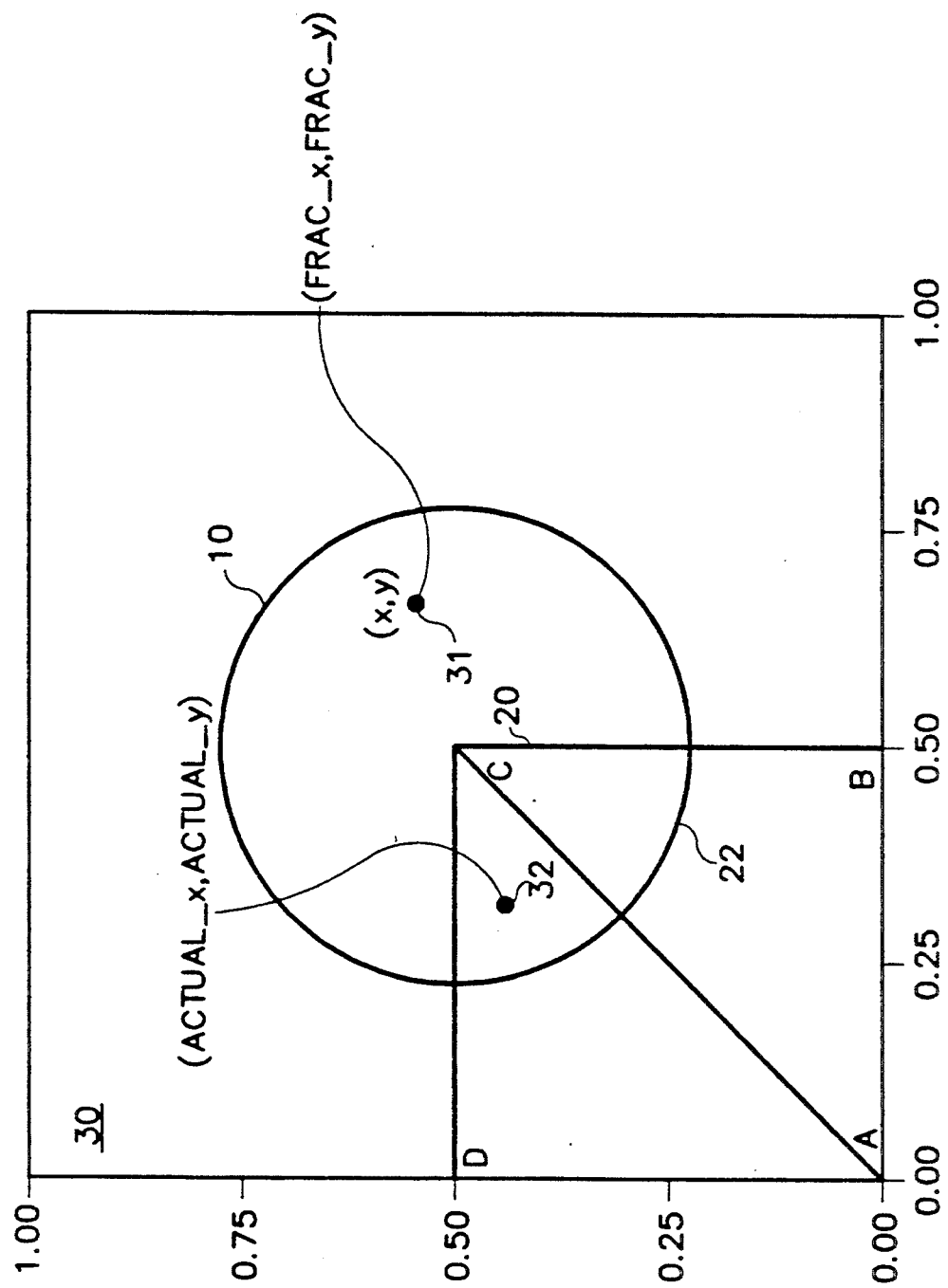
FIG. 3 illustrates the relationship of one of the elliptical dots of FIGS. 2A through 2C positioned within a halftone reference cell.

FIG. 3 is a diagram of a halftone reference cell 30 containing an elliptical dot 10. Due to the symmetry of the elliptical dot 10 the lower left quadrant 20, defined by vertices A,B,C, and D, represents the remaining three quadrants. A coordinate system for the reference cell 30 is shown normalized such that any point in the reference cell may be expressed as an ordered pair of values between 0 and 1.

FIGS. 4A through 4I illustrate the dot transitions occurring within reference cells 30 corresponding roughly to the transitions shown in FIGS. 2A through 2I, respectively.

Figure 5A:
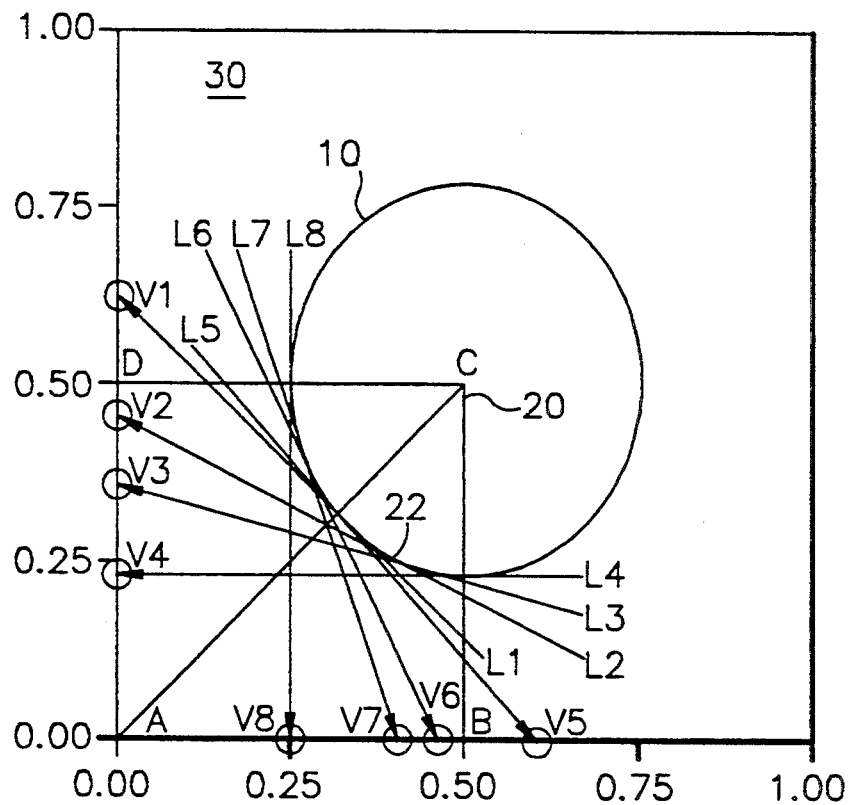
FIGS. 5A and 5B illustrate elliptical dots having an area of less than 50% and more than 50%, respectively, in a reference cell, with tangent lines intersecting an axis of the reference cell and forming a partial envelope.

FIG. 5A is another enlarged view of the segment of FIG. 3 showing eight lines L1 through L8 having the slopes $-1$, $-\frac{1}{2}$, $-\frac{1}{4}$, 0, $-1/M$, $-2$, $-4$, and infinite (vertical), respectively, which are tangent to the circumference of the elliptical dot shape 10 and are totally within the area bounded by the square ABCD. The envelope formed by the lines L1 through L8 is a good approximation for the elliptical arc 22. As it approaches 50 percent dot area, an eliptical dot looks like a rhombus which has two (equal) acute angles at opposite vertices. The tangent of half this acute angle is equal to the value M. As a result, M (which can range from 0.5 to 1.0) is a shape parameter such that M=1 yeilds a rhombus which is actually a square and M=$\frac{1}{2}$ yields a rhombus having an acute angle of approximately 53 degrees.

As previously stated, by multiple symmetries, in this instance four, the information in the square ABCD is sufficient to generate the entire halftone elliptical dot envelope. For example the arc 22 may be used to generate the entire elliptical envelope of the halftone dot 10. Therefore, it is sufficient to focus on representing the envelope of the elliptical dot shape only in the area of the square ABCD as such a representation may be flipped within the reference cell 30 to form the complete envelope of the elliptical dot 10. The lines L1 through L4 intersect the Y-axis at values V1 through V4, respectively, and lines L5 through L8 intersect the X-axis at values V5 through V8, respectively. These values are recorded to represent the density (size of the elliptical dot 10).

The aforementioned discussion is applicable to elliptical dots that are less than 50% of the area of the reference cell. This limit is represented by the elliptical dot shown in FIG. 4I. For elliptical dots larger than 50%, the elliptical dots' outline becomes concave rather than convex, as is shown in FIG. 5B. In FIG. 5B an elliptical dot 13 is shown with major portions of its outer envelope being aligned abutting with the walls of the reference cell 30. The corner portions of the elliptical dot 13 are concave in shape as reflected by the portion labeled 23. The region of interest will now shift to be the square ABCD. In addition to being concave, curve 23 is also located in the corner A of square ABCD. By reflecting the square ABCD through the center point E, as indicated in FIG. 6A, the curve 23 moves to the upper portion of the square ABCD and appears convex, as shown in FIG. 6B. Reflecting the square ABCD, in this manner allows elliptical dots in excess of 50% to be encoded using the same methods that are used for elliptical dots less than 50%. As can be seen the tangent lines L1 through L8 (only L1–L4 are shown for simplicity) still represent the envelope section (curve) 23. Whether the square ABCD has been reflected or not is recorded in the value of a bit V0 (to be described later). Referring to the TABLE OF ELLIPTICAL DOT PARAMETERS it can be seen that pairs of elliptical dots of complementary area, such as a 20% dot and an 80% dot have identical parameters except for the value of bit V0.

To cause the printing of the elliptical dot, for example, by a laser printer there is a corresponding sample point in the unit reference cell 30 that is identified by X and Y coordinate values and a contone value that is derived from the image. The contone value is a value from 0 to $2^N-1$ where N is the number of bits per pixel. A typical value for N is 8 thus contone values would range from 0 to 255. Each contone value has a corresponding halftone elliptical dot envelope. The signal to the laser printer is then determined by whether the sample point is inside the elliptical dot envelope or not. Referencing back to FIG. 3, an arbitrary sample point 31 having coordinates (frac_X, frac_Y) is processed as follows:

If frac_X $> \frac{1}{2}$ then the component X is replaced by 1-frac_X, otherwise the component X remains unchanged. The Y component is processed similarly. Thus the arbitrary sample point has now moved to the position (actual_X, actual_Y) in the lower left quadrant of the unit reference cell since both actual_X and actual_Y must be less than or equal to $\frac{1}{2}$. The moved sample point is identified as point 32. Because of the elliptical dot's shape symmetry the original point (frac_X, frac_Y) is inside the elliptical dot boundary if and only if the point (Actual_X,Actual_Y) is inside the elliptical dot boundary.

It is to be remembered that the selection of eight intercept lines, for the preferred embodiment, is driven by the particular hardware implementation to be described and that other numbers of lines can also be used, that is, either less and or more lines can be used to define the envelope of the formed elliptical dot. It additionally is to be appreciated that other Geometric elements besides lines may also be used to represent the envelope of the elliptical dot, for example, circular and parabolic arcs or Bezier curves and or splines.

Figure 4A:
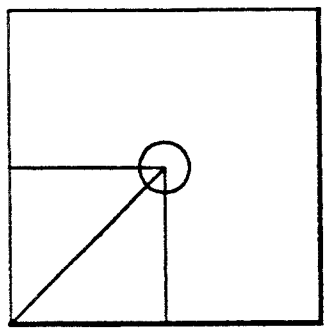
FIGS. 4A through 4I illustrate the correspondence of the elliptical dots of FIGS. 2A through 2I positioned within unit reference cells.
Figure 4B:
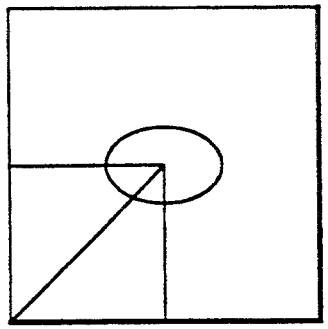
Figure 4C:
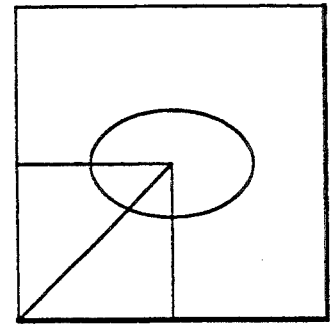
Figure 4D:
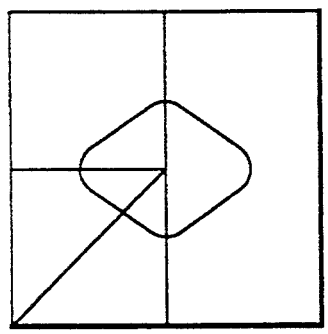
Figure 4E:
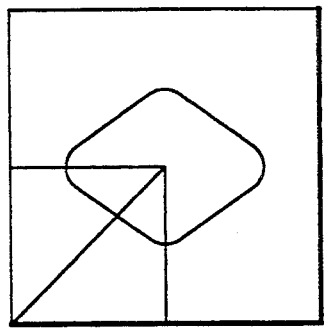
Figure 4F:
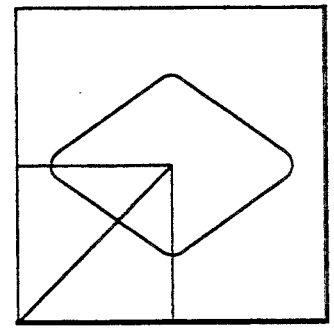
Figure 4G:
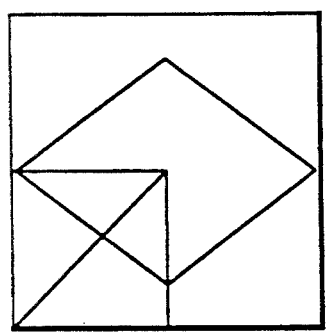
Figure 4H:
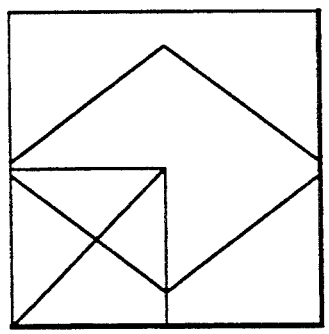
Figure 4I:
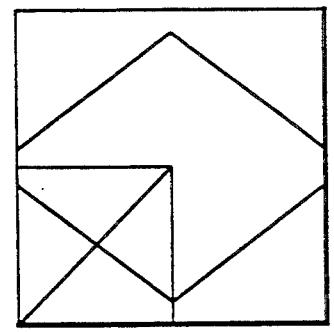
Figure 5B:
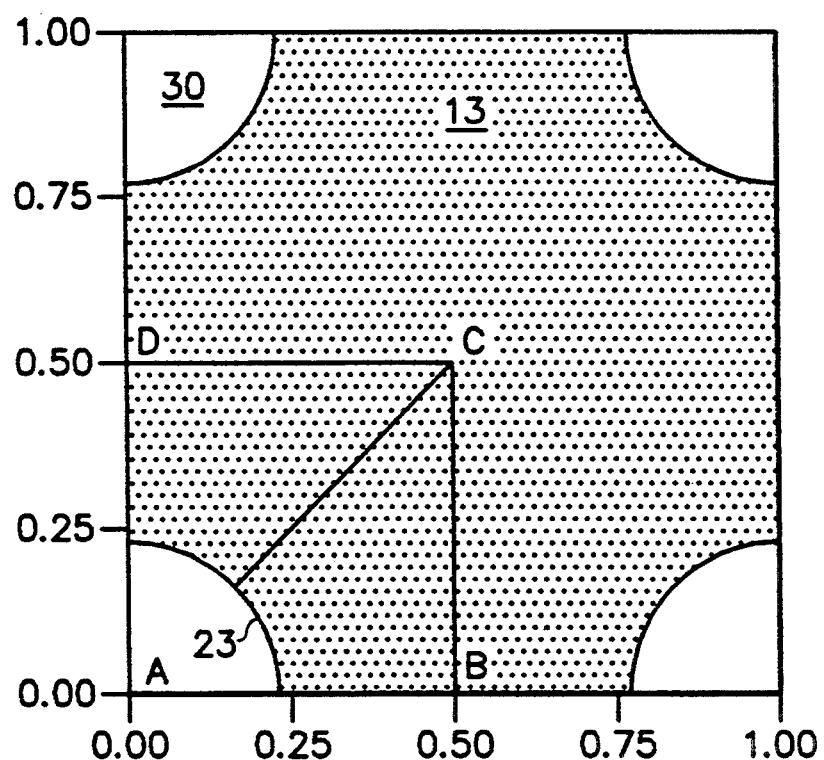

Referring back to FIG. 5B, when the size of the elliptical dot exceeds that of the full diamond of FIG. 4I the open spaces around the diamond dot shape commence to reduce in size and or close. This reduction of the open corner spaces occurs in the reverse order of that shown in FIGS. 2A through 2I. That is, as the dark part of the elliptical dot 13 fills in the open areas close towards elliptical shapes that appear in each of the four corners of the halftone reference cell.

Figure 7:
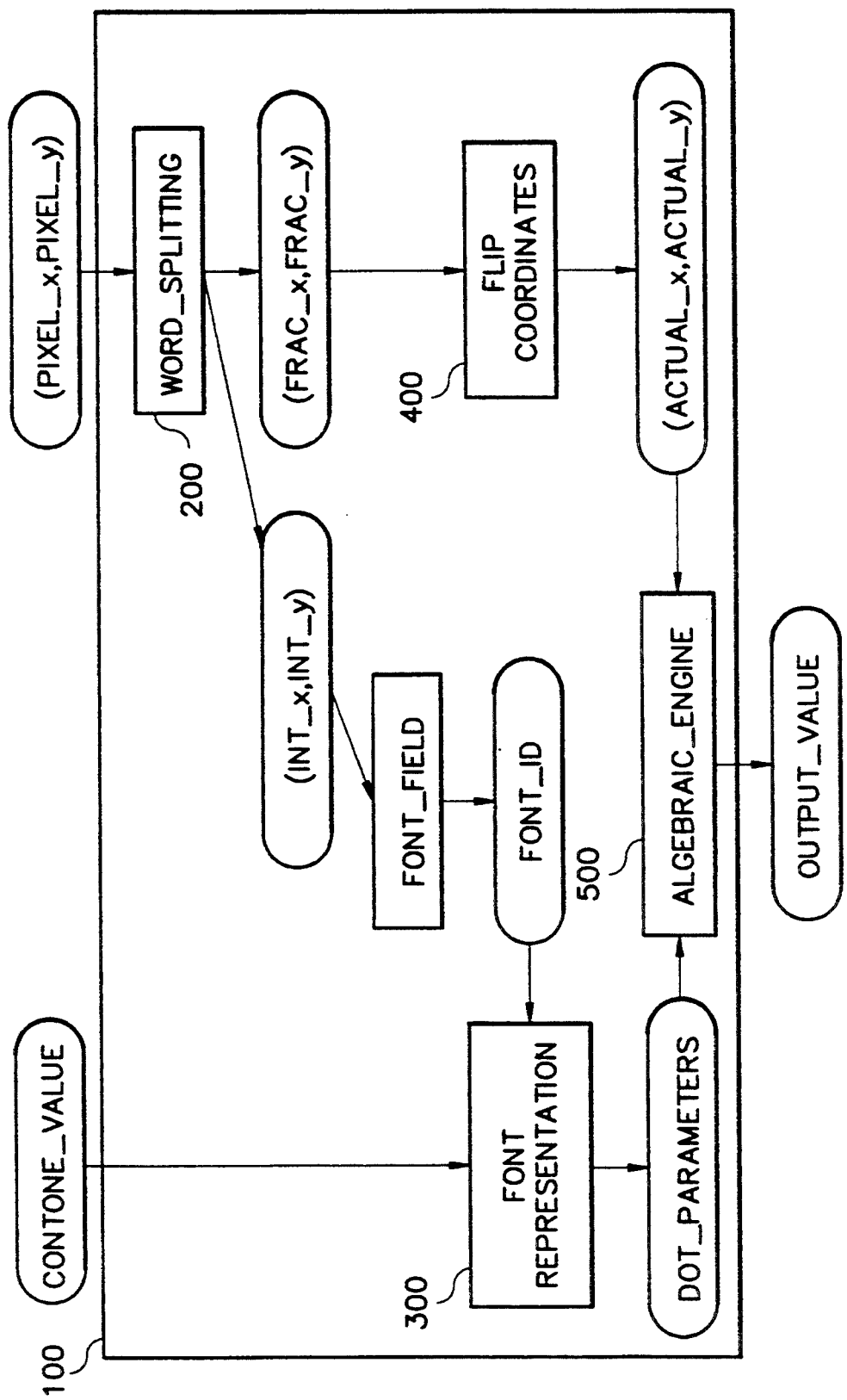
FIG. 7 illustrates, in logic block diagram form, a functional embodiment of the invention.

Referring to FIG. 7, the font decoder 100, is shown in functional detail receiving as inputs the contone value and the X-Y halftone sampling coordinate values (pixel_X, pixel_Y) corresponding to the pixel that is to be written (printed). The output value from the font decoder 100 is the bit mapped data that is used to drive a marking engine such as a laser printer. The contone value, as previously stated, has a value of from 0 to 255 and indicates the desired size (density) of the halftone elliptical dot. These three values are generated according to the teachings of U.S. Pat. No. 4,977,458.

Figure 8:
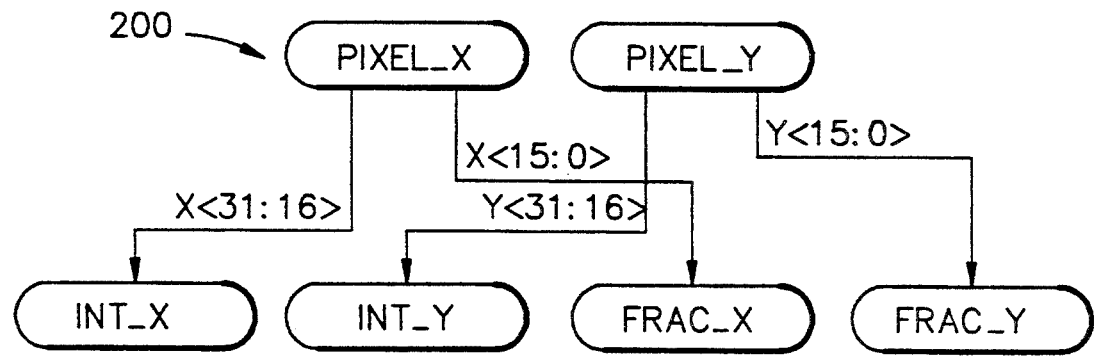
FIG. 8 illustrates, in further detail, the word_splitting block of FIG. 7.

Within the font decoder 100 a word splitting module 200, illustrated in logic detail in FIG. 8, functions to form two signal groups of high and low order bits, int and frac, respectively. The values int_X and int_Y are represented by 2-bytes of high order bits (16 bits of the bits defining pixel_X and pixel_Y) and the values frac_X and frac_Y are represented by 2-bytes of low order bits. The high order bits represent the integer value of pixel position and the low order bits represent the fractional value of the pixel's X-Y coordinate position. The integer byte values are used to select, from a font representation module 300, which font is to be printed. In the most limited system only one font type would be available. Although many different types of storage devices may be used to addressably store the elliptical dot parameters in the preferred embodiment of the invention a look-up table (array) was used. A partial address is obtained by the contone value with the remainder being obtained from the font_id (when multiple fonts are provided).

Figure 9:
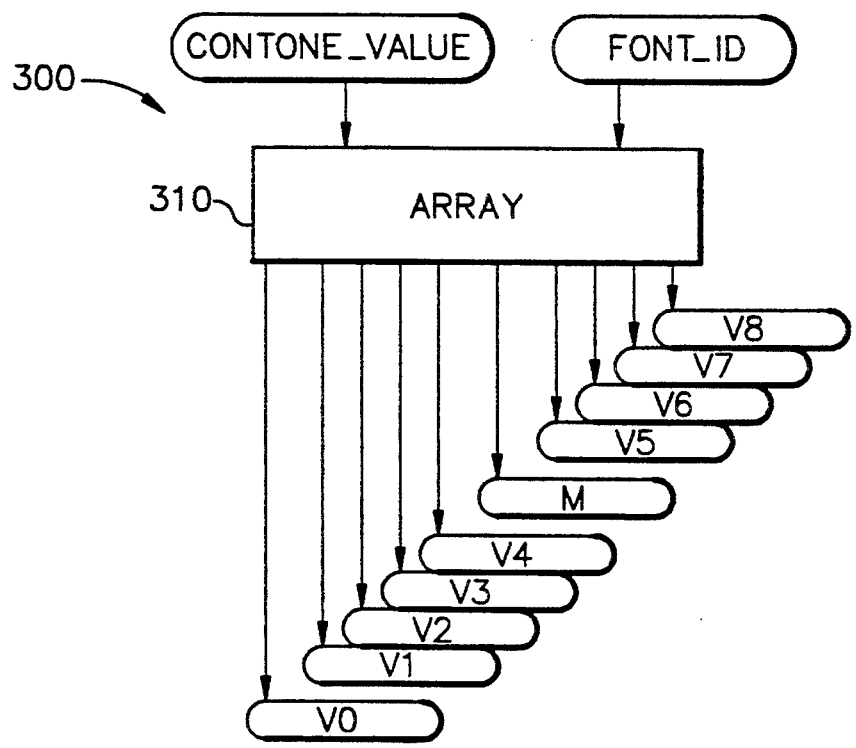
FIG. 9 illustrates, in further detail, the font representation block of FIG. 7.

The font representation module 300, illustrated in logic form in FIG. 9, is an array 310 of elliptical dot descriptors having an elliptical dot descriptor for each contone value. Each elliptical dot descriptor is a set of elliptical dot parameters in which all necessary elliptical dot information needed for re-construction is encoded. For each combination of contone_value and font_id there is a unique set of elliptical dot parameters, V0 through V8, which are sent to an algebraic engine 500.

The following Table illustrates the values V0–V8 for elliptical dot percentages of 10, 20, 40, 60 and 80 dot sizes. The values of V1–V8 are encoded assuming a 16bit integer representation as an example. Thus values of 0-65535 represent the full range of 0-1 on the edge of the reference cell (see 5A).

| TABLE OF ELLIPTICAL DOT PARAMETERS | | | | | | | | | |
|---|---|---|---|---|---|---|---|---|---|
| AREA | V0 | V1 | V2 | V3 | V4 | V5 | V6 | V7 | V8 |
| 10% | 0 | 49000 | 36079 | 28908 | 21076 | 41920 | 36079 | 28908 | 21076 |
| 20% | 0 | 42151 | 30665 | 23915 | 16232 | 41920 | 30665 | 23915 | 16232 |
| 40% | 1 | 0 | 0 | 0 | 0 | 40583 | 0 | 0 | 0 |
| 60% | 1 | 0 | 0 | 0 | 0 | 40593 | 0 | 0 | 0 |

-continued

TABLE OF ELLIPTICAL DOT PARAMETERS

| AREA | V0 | V1 | V2 | V3 | V4 | V5 | V6 | V7 | V8 |
|------|----|-----|-----|-----|-----|-----|-----|-----|-----|
| 80%  | 1  | 42151 | 30665 | 23915 | 16232 | 41920 | 30665 | 23915 | 16232 |

The algebraic engine 500 determines how the elliptical dot is sampled. The four units, word_splitting 200, font representation 300, flip coordinates 400 and algebraic engine 500 work together to form, stepwise, the correctly sized elliptical dot pattern for each of the pixel values that in turn form the printed image.

Figure 10:
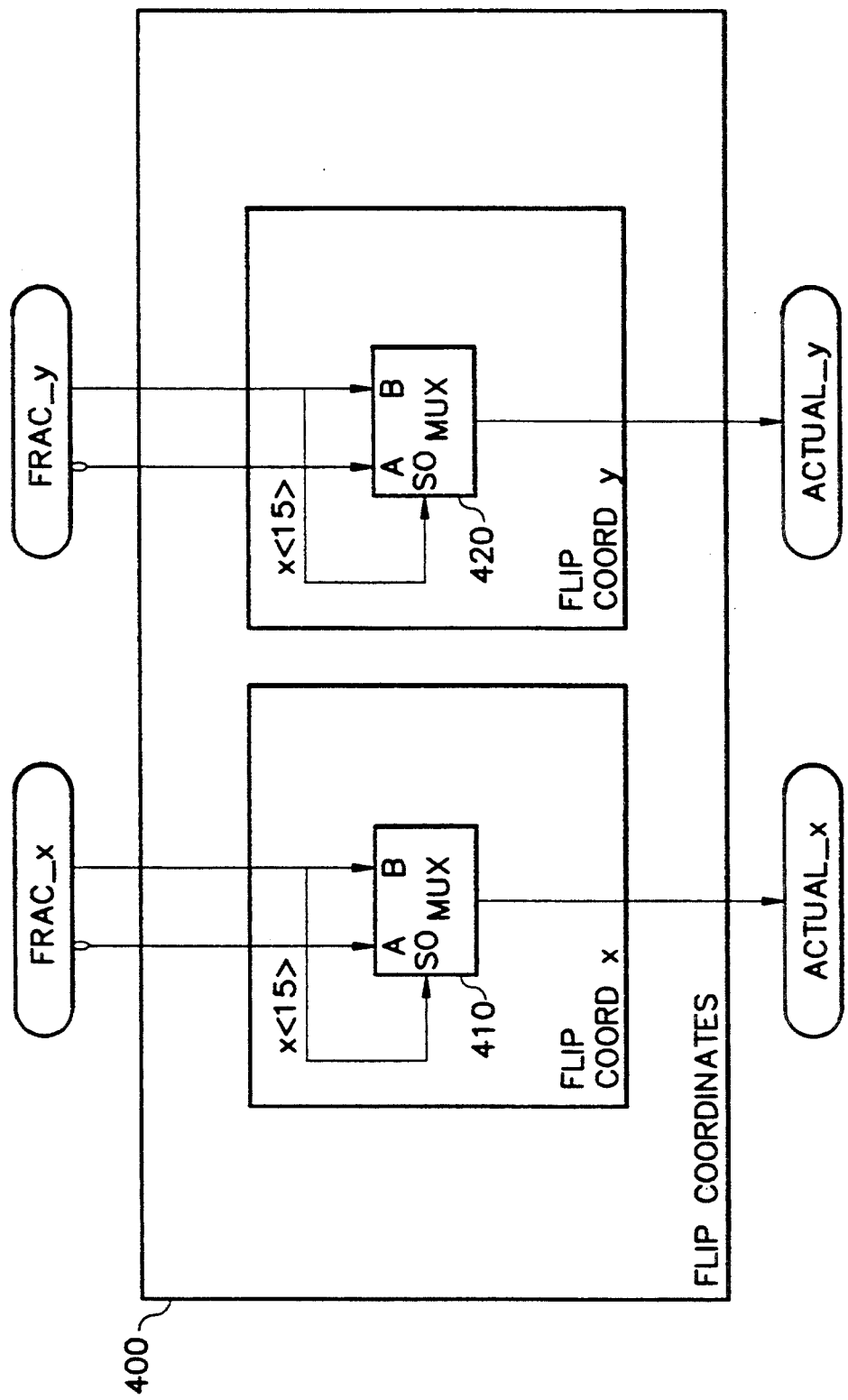
FIG. 10 illustrates, in further detail, the flip coordinates block of FIG. 7.

The flip coordinates module 400, illustrated in schematic form in FIG. 10, functions to flip the coordinates from the full cell to the lower left quadrant to exploit some of the elliptical dot's symmetry. This is implemented with multiplexers 410 and 420. The 15th bit of the frac_X and the frac_Y signals are used to select whether the multiplexers pass the negated signals on their A input or the non-integrated signals that are on the B inputs. In other words, the value of the coordinates X and Y are flipped or not flipped dependent on the value of the 15th bit of the non-negated frac_X and frac_Y signals. Further appreciation of the flipping action may be had by reference to elliptical dot positions labeled in the FIG. 3 example.

Figure 11:
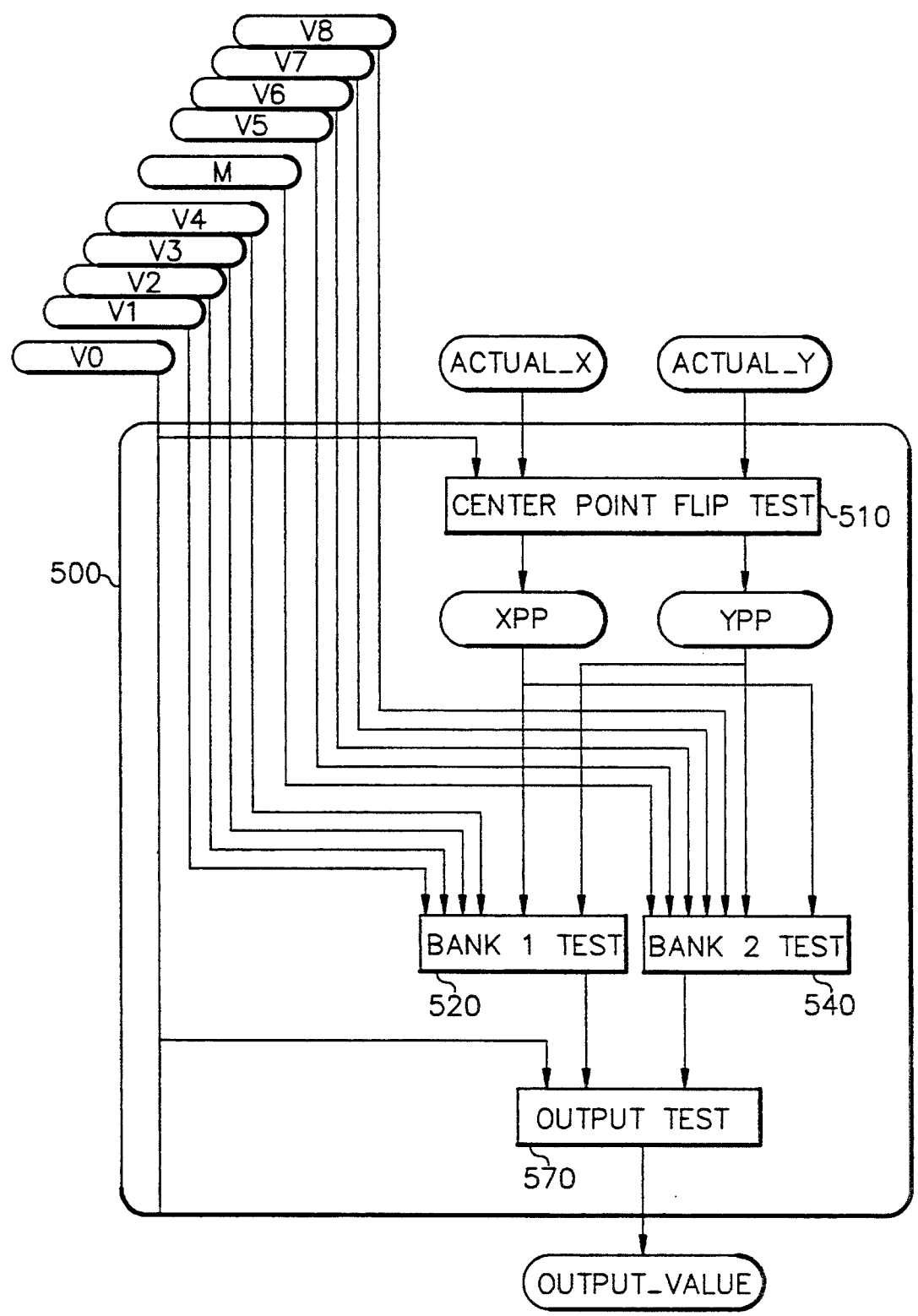
FIG. 11 illustrates, in further detail, the algebraic_ engine block of FIG. 7.

The algebraic_engine 500, illustrated in logic form in FIG. 11, functions to compute the output, output_value, at the sample point (actual_X, actual_Y). The output value is a single bit intended for a binary writer and is a function of both the elliptical dot parameters and the sampling point (actual_X, actual_Y). To perform halftone printing a sequence of these bits is generated similar to those generated by the font memory 970 of the #622 patent but with less cost.

The aforementioned logic modules may be run in parallel to achieve multi-bit output if desired.

In FIG. 11, the signals actual_X and actual_Y are directed to a center point flip test function block 510 along with the signal V0. The center point flip test 510 depends on the bit V0 indicating whether the elliptical dot area is above 50% or not. Referring to FIGS. 6A and 6B, if the elliptical dot has an area Greater than 50% of the reference cell the point ($X_p$, $Y_p$) must be reflected through the center point E. yielding point ($X_{pp}$, $Y_{pp}$). If the elliptical dot is 50% or less, no change is required, i.e., $X_{pp}=X_p$ and $Y_{pp}=Y_p$. In either case ($X_{pp}$, $Y_{pp}$) will be compared against a convex envelope located in the top portion of the square ABCD.

Once the position of the envelope within the square ABCD is determined, testing for the point being inside or outside the elliptical dot boundary may begin. A Bank 1 test 520 and a Bank 2 test 540 test the intersect points V1-V4 and V5-V8, respectively. The value M is inputted to Bank 540 along with the values Xpp, and Ypp. Bank 520 also receives as inputs the values Xpp, and Ypp. The output test block 570 receives as inputs the output values from banks 520 and 540 along with the signal V0 to provide at its output the signal output_value.

It is to be remembered that the intersect points $V_1$-$V_4$ pertain to lines $L_1$-$L_4$ having slopes $-1$, $-\frac{1}{2}$, $-\frac{1}{4}$, and zero respectively. Likewise points V5-V8 pertain to lines L5-L8 having slopes, $-1/M$, $-2$, $-4$, and infinity.

Figure 12:
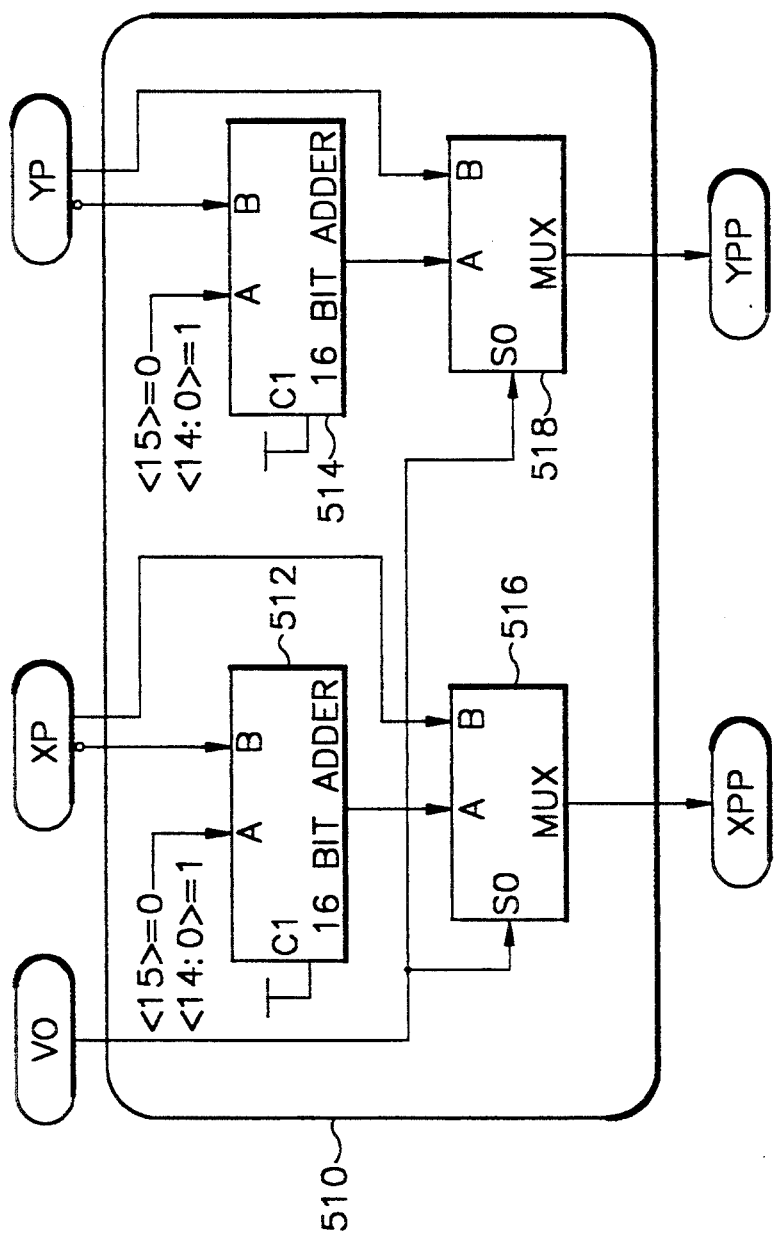
FIG. 12 illustrates, in more detail, the center point flip test block of FIG. 11.

Referring to FIG. 12, the center point flip test 510 is formed from a pair of 16 bit adders 512 and 514 and a pair of multiplexers 516 and 518. The adder 512 receives the signal Xp, negated on its B input. Logically the function that is performed is to subtract the value of XD from $\frac{1}{2}$ which represents the value of side AB of the square ABCD. The adders have the A inputs tied such that the 15th bit equals 0 and bits 0 through 14 equal 1. The multiplexer 516 outputs that value if the bit V0 indicates that the elliptical dot is greater than 50% by passing the signal on the multiplexer's A input to the output as Xpp, or if the dot is less than 50% the signal Xp is passed from the B input of the multiplexer to the output as Xpp. Adder 514 and multiplexer 518 operate in the same manner for the signal Yp.

Figure 13:
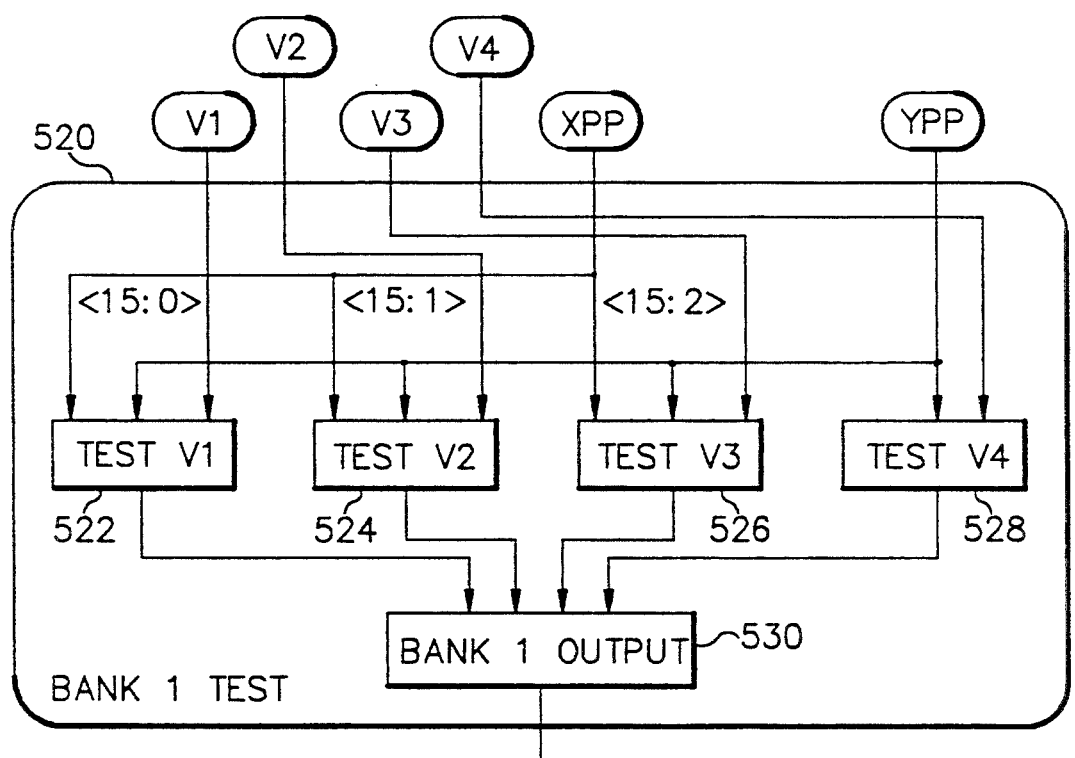
FIG. 13 illustrates, in further detail, the Bank 1 Test block of FIG. 11.

Referring now to FIG. 13, the Bank 1 Test 520 is formed of four test modules 522, 524, 526, and 528 which output their signals to the bank 1 output block 530. The signal Ypp is inputted to each of the test modules, the signal Xpp is inputted to modules 522, 524 and 526, along with the signals V1-V3, respectively. The signal V4 is inputed to module 528.

Test $V_1$ is a test to see if the point ($X_{pp}$, $Y_{pp}$) is above or below line $L_1$. If above the line, the test is true. Test $V_2$, $V_3$, and $V_4$ are similar tests for their respective lines.

Figure 15:
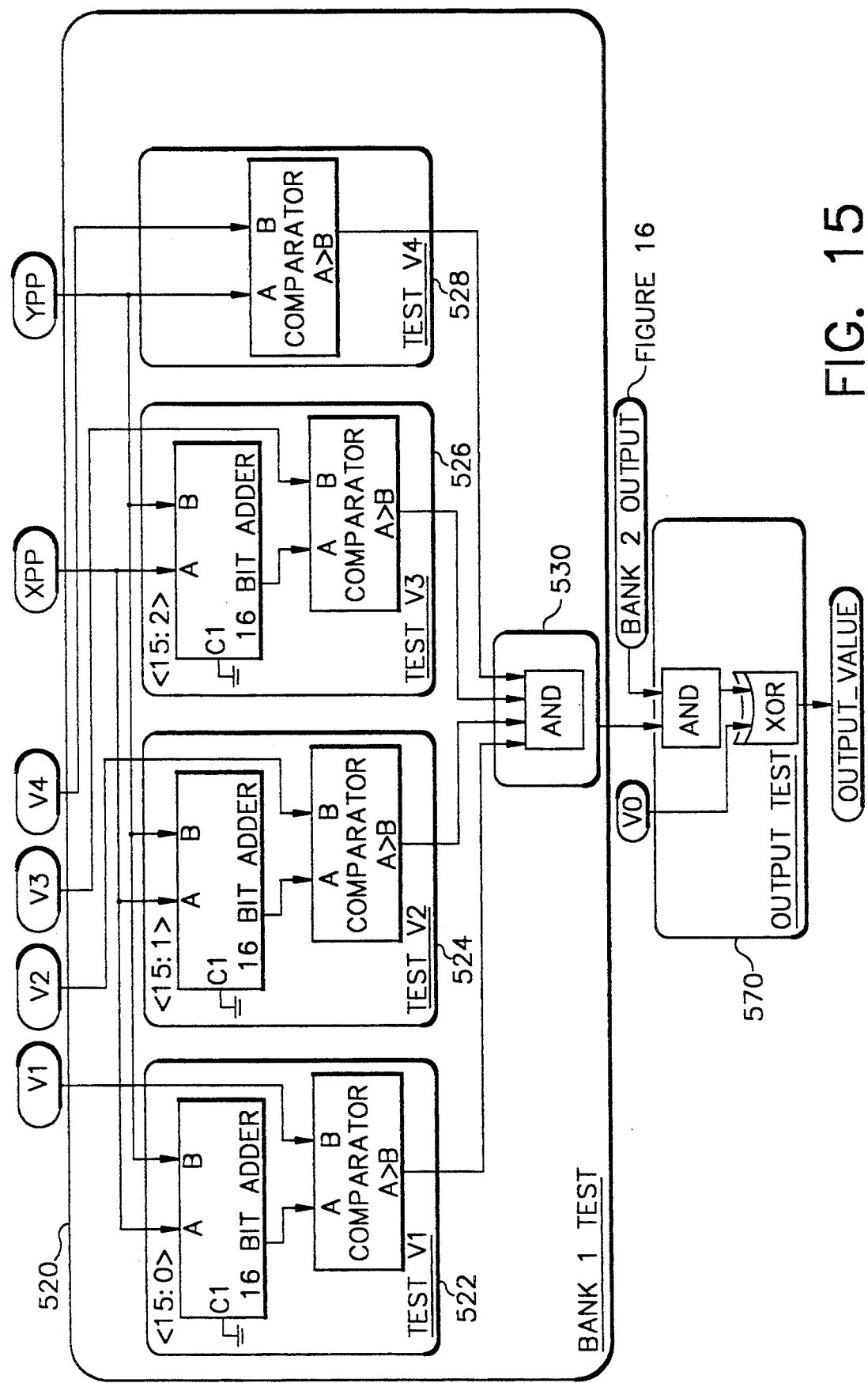
FIG. 15 illustrates, in chip logic schematic detail, the Bank 1 Test block of FIGS. 11 and 13 along with the output test block of FIG. 11.

The bank 1 output 530 is a logic AND function with four inputs (shown in FIG. 15).

Figure 14:
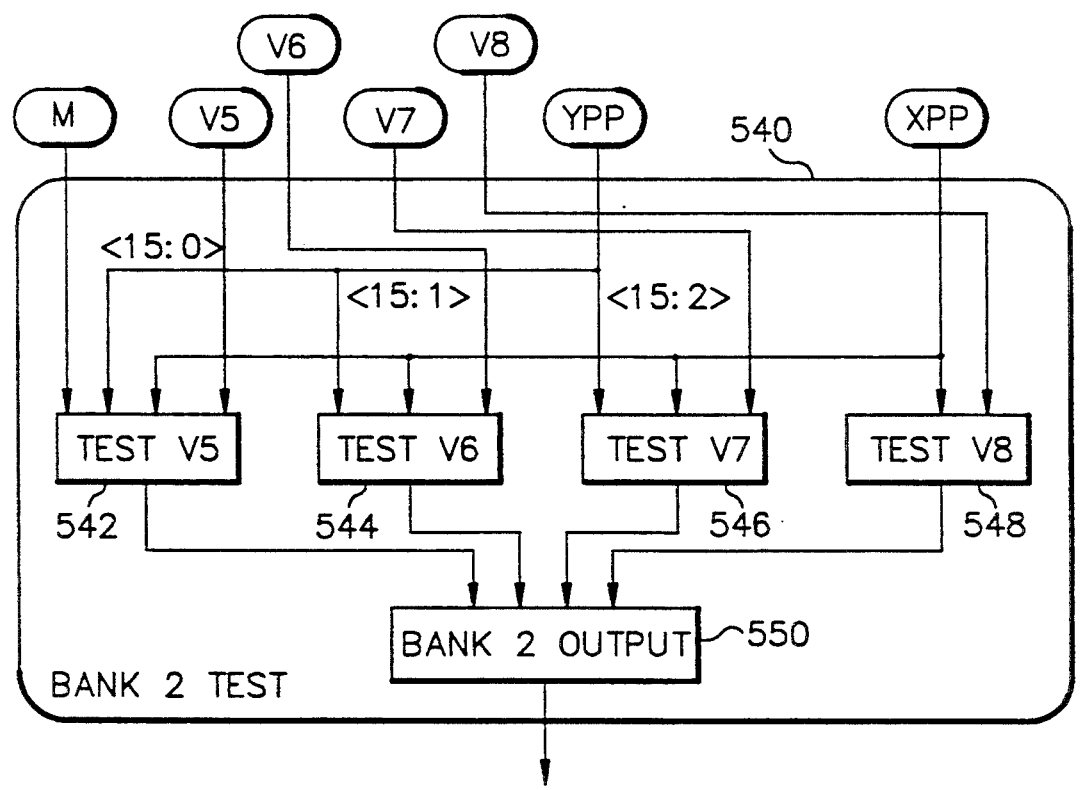
FIG. 14 illustrates, in further detail, the Bank 2 Test block of FIG. 11.

Referring now to FIG. 14, the Bank 2 Test 540 is formed of four test modules 542, 544, 546, and 548 which output their signals to the bank 2 output block 550. The signal Xpp is inputed to each of the test modules, the signal Ypp is inputed to modules 542, 544 and 546, along with the signals V5-V7, respectively. The signal V8 is inputed to module 548. And the signal M is inputed to the module 542.

Test V5 is a test to see if the point ($X_{pp}$, $Y_{pp}$) is to the right or to the left of line L5. If it is to the right of the line, the test is true. Test V6, V7, and V8 are similar tests for their respective lines.

Figure 16:
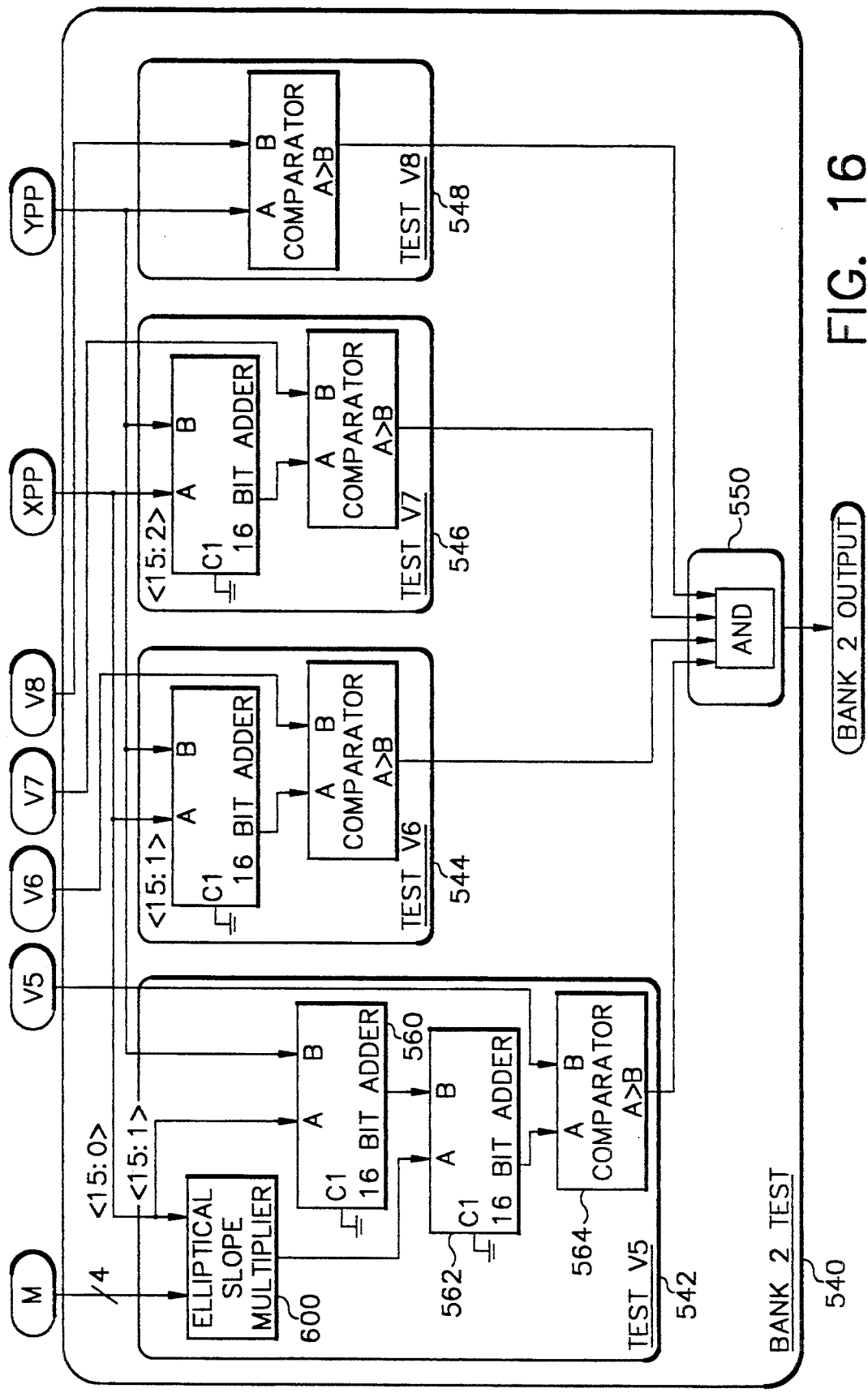
FIG. 16 illustrates, in chip logic schematic detail, the Bank 2 Test block of FIGS. 11 and 14.

The bank 2 output 550 is a logic AND function with four inputs (shown in FIG. 16).

Referring now to FIG. 15, wherein each of the test blocks, 522, 524, 526, and 528, are illustrated in further detail. Blocks 522, 524, and 526 each contain a 16 bit adder and a comparator. The adders receive on their A inputs the signal Xpp, and on their B inputs the signal Ypp. Notice that blocks 524 and 526 receive the Xpp value shifted to the right by one and two bits, respectively. This divides the Xpp value by two and four, respectively. This arrangement configures block 522 to a slope of 1, block 524 to a slope of $\frac{1}{2}$, and block 526 to a slope of $\frac{1}{4}$. The comparators in blocks 522, 524, and 526 each compare the output from a respective adder with their input values V1 through V3. The block 528 does not contain an adder, only a comparator which receives the signal V4 and the signal Ypp on the indicated inputs. This particular configuration corresponds block 528 to a zero slope tester. The outputs from all of the comparators are directed as inputs to the bank 1's output 530, which is an AND gate. The output block 570 performs two functions, the first determines whether the point ($x_{pp}$, $y_{pp}$) is within the envelope or not. It is within the envelope if outputs from bank 1 and bank 2 are both true. The second function determines whether being inside or outside of the dot is to cause a printing. This is determined by inputting the value of V0 to an input of an XOR gate, along with the ANDed output of the bank 1 and bank 2 signals.

Referring to FIG. 16, the Bank 2 test block 540 is substantially identical to block 520 with the exception that block 542 is required to process the slope M signal and the signals Ypp and Xpp are reversed from their previous positions in FIG. 15. In block 542 the value of Ypp must be multiplied by slope M which is not an exact power of two. Within block 542 there is an elliptical slope monitor 600, a 16 bit adder 560, a 16 bit adder 562, and a comparator 564. The signals V6 to V8 have like roles to the signals V2 to V4 with the exception that the roles of Xpp and Ypp are interchanged. The test function of block 542 is the same as that of test V1 except that slope M needs to be handled explicity.

The binary representation of the actual elliptical slope is given as follows: 0.1 abcd where a, b, c, d, are either 0 or 1. The reason for setting the initial segment of the slope to 0.1 is that the slope is required to lie between ½ and 1. The initial digits thus make it at least ½ already. The subsequent digits a, b, c, d, specify the slope further. Adder 560 adds Xpp to ½ of Ypp, thus taking care of the leading digit 1. At this point the elliptical slope multiplier 600 is multiplying Ypp by the binary fraction 0.0 abcd. Adder 562 combines the output of 600 to the output of 560 and produces the value of Xpp plus Ypp times (0.1 abcd) which is applied to the A input of the comparator 564. Comparator 564 receives the signal V5 on its B input and compares this against the signal on its A input to provide a single bit indicative of whether A is greater than B or not.

Bank 550 is an AND gate that is identical to the one used in bank 1 which receives the outputs of blocks 542, 544, 546, and 548. The output of the AND gate is the bank 2 output signal.

Figure 17:
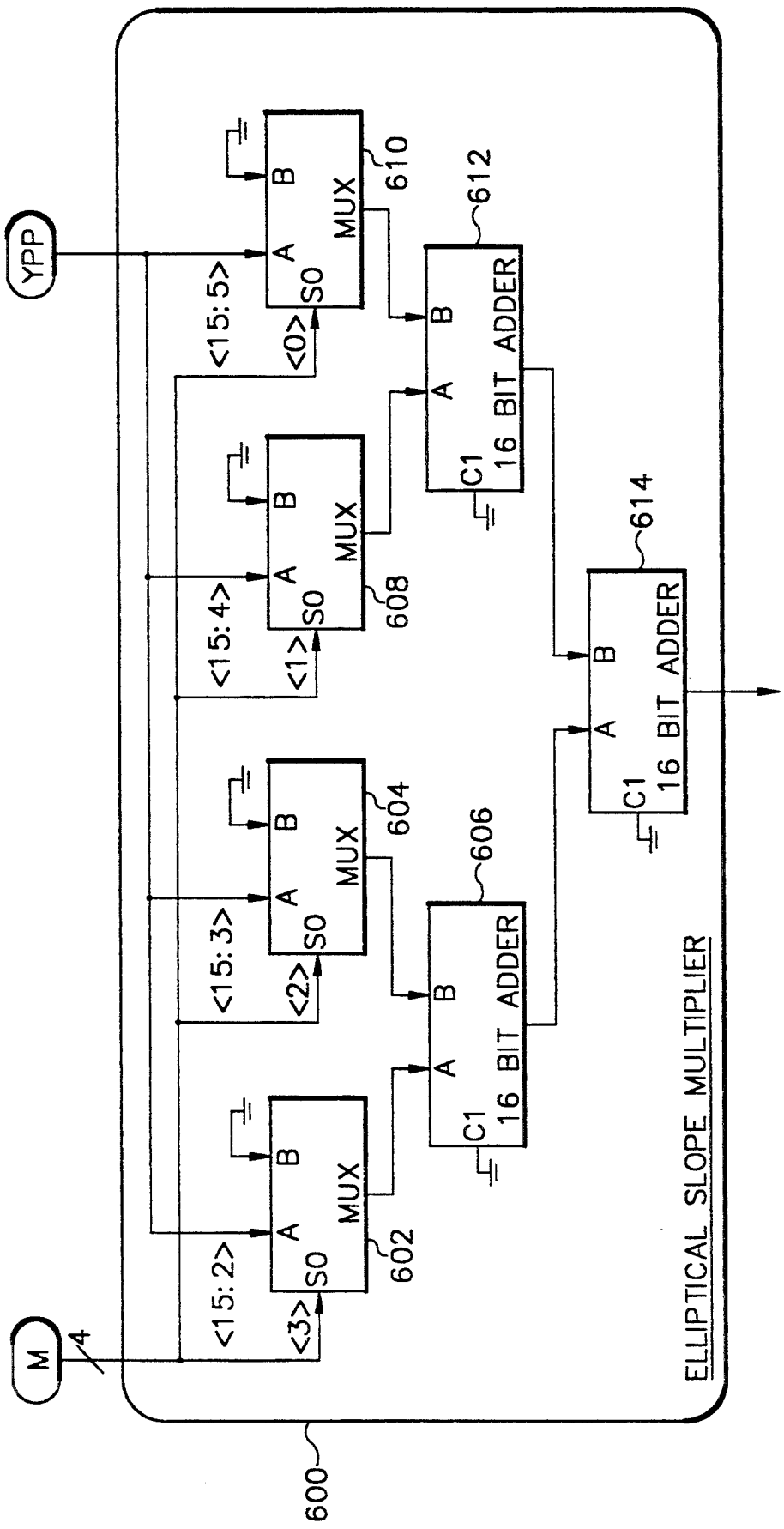
FIG. 17 illustrates, in chip logic schematic detail, the Elliptical Slope Multiplier of Figure 16.

Referring now to FIG. 17, the elliptical slope multipier 600 is comprised in part of four multiplexers 602, 604, 608, an 610. Each of the multiplexers has its B input connect to ground to logically represents a 0. The A inputs are connected to receive the signal Ypp shifted to the right by 2,3,4 and 5 bit positions, respectively. The selection inputs S0 are connected to receive the indicated bit component of the four bit signal M. The four bits labeled <3>, <2>, <1>, <0> correspond to the bits a,b,c,d as previously mentioned.

The 16 bit adder 606 receives the output form 602 on its A output and the output from 604 on its B input. The output from 606 is Ypp times (0.0 ab). The 16 bit adder 612 receives on its A input the output from 608 and on its B input the signal from 608. The output of adder 612 is Ypp times (0.000 cd). These outputs are directed to the A and the B inputs of the 16 bit adder 614 with the output therefrom being the signal Ypp times (0.0 abcd).

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

INDUSTRIAL APPLICABILITY AND APPLICATIONS

The apparatus and method of the present invention may be used in any system that prints halftone dots wherein the dots are stored as digital values. The advantage of the present invention is that the amount of memory space needed to store the digital values that represent the different sizes and/or shapes of the dots is significantly reduced.

We claim:

1. Apparatus for generating an elliptical halftone dot pattern comprising:
   storing means having stored therein dot parameters representing the envelope of at least one elliptical halftone dot;
   means for receiving position signals corresponding to the printing coordinates of a marking engine, and;
   means for comparing the received position signals with the stored dot parameters to determine if a printing is to be performed by the marking engine at the printing coordinates.

2. The apparatus according to claim 1 wherein said storing means is a look-up table.

3. Apparatus for generating an elliptical halftone dot pattern comprising:
   means for providing dot parameters representing intersect values of a number of lines drawn from boundary points on the envelope of an elliptical dot to a reference axis of the elliptical dot;
   means for receiving position signals corresponding to the printing coordinates of a marking engine; and
   logic means for comparing the receiving position signals with the provided elliptical dot parameters to determine if a printing is to be performed by a marking engine at the printing coordinates and for providing an output signal for enabling the marking engine.

4. The apparatus according to claim 3 wherein said means for providing elliptical dot parameters provides groups of dot parameters, with each group representing an elliptical dot of different size.

5. The apparatus according to claim 4 wherein said logic means includes;
   means for utilizing the elliptical dot parameters representing only a symmetrical segment of the envelope of an elliptical dot to provide said output signal to enable the marking engine.

6. Apparatus for generating an elliptical halftone dot pattern utilizing elliptical dots defined by envelope parameters comprising:
   addressable memory means for storing a plurality of elliptical dot descriptors each at its own address with each descriptor formed from a set of elliptical dot parameters and each set of parameters including intercept values representing corresponding elliptical halftone dot sizes wherein elliptical dot size corresponds to a density value and wherein said intercept values represent the intercept of tangent lines with a reference axis and the outer boundary of the elliptical dot;
   means for receiving signals representing the printing position of an elliptical dot onto a receiving medium and for selecting fonts and for providing a partial address to said addressable memory means in response to said received signals;
   means for providing a contone value to said addressable memory means to provide the remaining portion of the address to select a corresponding set of elliptical dot parameters; and
   engine means coupled to said addressable memory means for receiving the set of elliptical dot parameters and the signals representing an elliptical dot's printing position for providing output values to a printing engine for causing the printing of an elliptical halftone dot at the indicated position with the dot's size and shape being represented by the set of elliptical dot parameters.

7. The apparatus according to claim 6 wherein the elliptical dot parameters represent at least one segment of symmetry of the envelope of the elliptical dots and said engine means further comprises:

means for reconstructing said elliptical dots from said dot elliptical parameters by flipping the at least one segment of symmetry to complete the entire elliptical dot envelope.

8. The apparatus according to claim 7 and further comprising:

means for providing flip coordinates to said engine means comprised of:

first and a second multiplexers receiving as selectable inputs bits representing the x and negated x coordinate and the y and the negated y coordinate, respectively of the elliptical dot that is to be printed, said multiplexers having a selection input for receiving a selection bit that selects which bits will be passed to said engine means to represent actual x and actual y coordinates.

9. The apparatus according to claim 7 wherein said engine means is further comprised of:

flip test means for receiving the signals representing an elliptical dot's printing position and for folding the position to be within the segment of symmetry represented by said elliptical dot parameters and for providing signals representing the folded position; and testing means for receiving and testing the provided signals from said flip test means with the received elliptical dot parameters to provide an output print value for all coordinate positions within the envelope of a selected elliptical dot.

* * * * *